Feb. 19, 1957 M. J. CHEVALIER 2,781,758
ARTIFICIAL FEMORAL HEAD
Filed Jan. 24, 1955
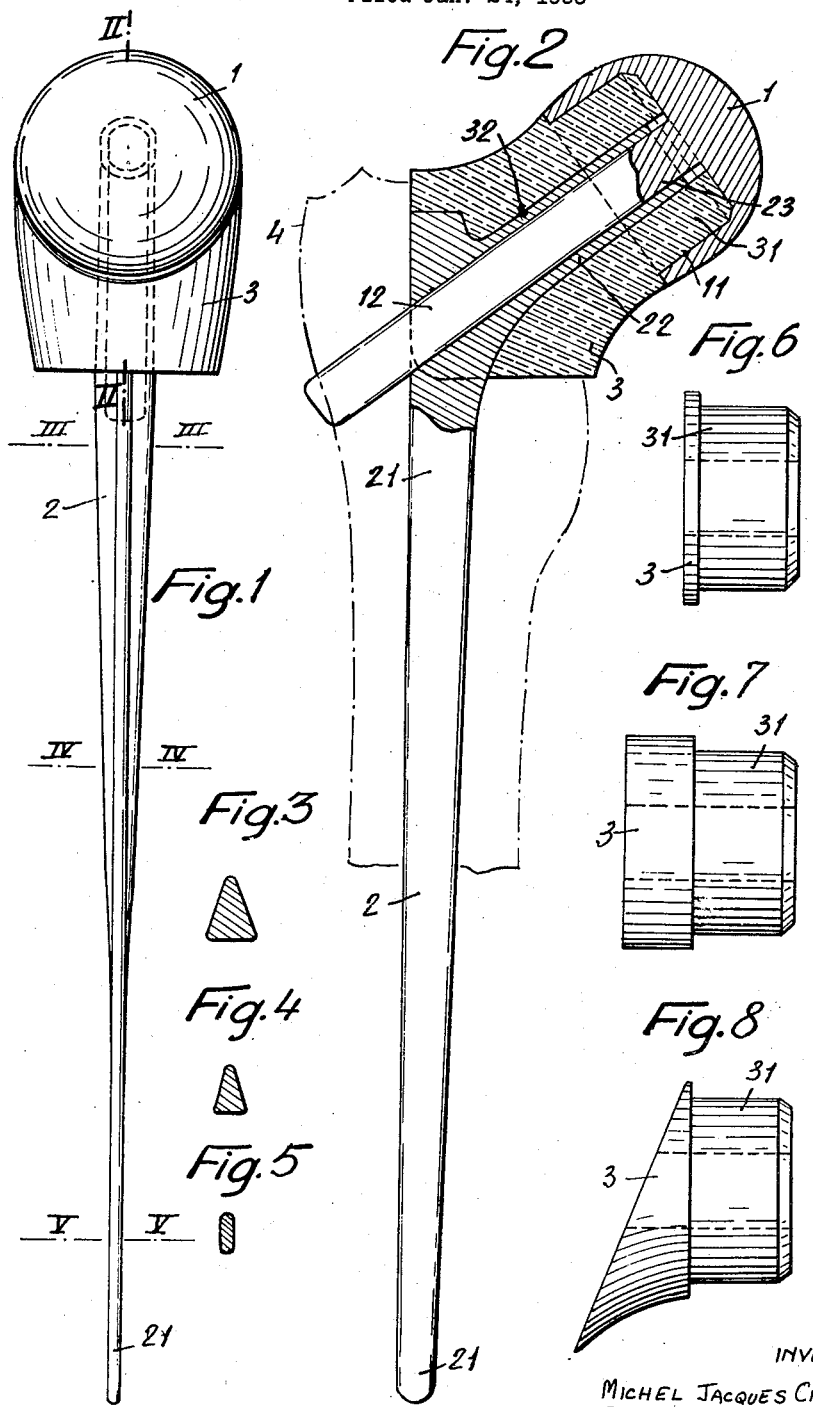
INVENTOR:
MICHEL JACQUES CHEVALIER
BY:

United States Patent Office 2,781,758
Patented Feb. 19, 1957

2,781,758
ARTIFICIAL FEMORAL HEAD
Michel Jacques Chevalier, Paris, France Application January 24, 1955, Serial No. 483,637

Claims priority, application France January 29, 1954

4 Claims. (Cl. 128—92)

The object of the present invention is an artificial femoral head, comprising one or more of the following arrangements:

(a) The femoral head is composed of a head proper, made of metal and an intermediate part of thermosetting material (preferably acrylic resin) interposed between the resected portion of the bone and the metal head, the assembly of these two elements being mounted on an intra-medullary nail intended to be driven into the medullary portion of the femur.

(b) The metal axle of the femoral head proper can slide freely after the end of the operation, inside an aperture of an intra-medullary nail.

(c) The sections of the axle of the femoral head and the aperture of the intra-medullary nail are not circular so as to prevent a rotation of the head on the nail.

By way of example only, the appended drawing represents:

In Figure 1, a view of an artificial femoral head according to the present invention.

In Figures 2 to 5, sections, respectively along the lines II—II, III—III, IV—IV, and V—V of Figure 1.

In Figures 6 to 8 three different forms of embodiment of the intermediate part.

The artificial femur head represented in Figures 1 to 5 comprises a head proper 1, a nail 2, and an intermediate part 3 made of thermosetting material, preferably acrylic resin.

The head 1 is made of metal, experience having shown that the spherical portions of the femoral heads made of acrylic resin has an excessive wear. This head 1 has the shape of a portion of a sphere, and comprises a housing 11 and an axle 12. The section of this axle is not circular and rather recalls that of a rectangle in which the two small sides are rounded.

The intra-medullary nail 2 is made of metal, and comprises a portion 21 having a triangular section (Figs. 3 and 4) becoming gradually rectangular (Figure 5) when nearing its end. This nail 2 comprises a portion 22, provided with a hole 23, the section of which is similar to that of the axle 12 and guides the latter with a gentle friction.

The intermediate part 3, made here of acrylic resin, comprises a cylindrical end 31, which enters the housing 11 in the head 1 and a hole 32 through which the portion 22 of the nail 2 passes with a gentle friction. This intermediate part 3, on which the head 1 rests, bears on the resected portion of the femur 4 and transmits to the latter the stresses it receives from the head 1.

It should be noted that due to the decomposition of the femoral head into two elements, one of them 1, made of metal, and the other one 3 made of thermosetting material, there is obtained, on the one hand, a resistance to wear comparable with that of femoral heads entirely made of metal, and, on the other hand, a tolerance of the resection cut in the femur equal to that obtained with femoral heads made entirely out of a thermosetting material.

Further, due to the fact of this decomposition of the femoral head into two elements 1 and 3, it is possible to use, with the same head 1 and the same nail 2, elements 3 of different shapes, such as these represented in Figures 6 to 8. The surgeon, therefore, can, with a single head 1 and a single nail 3 obtain a number of different femoral heads, equal to that of the intermediate parts 3 available to him, and he can thus resect the femur 4 in the manner most favorable to a good carrying out of the operation.

What is claimed is:

1. A prosthesis as described, adapted to be secured to the resected portion of the femur comprising, in combination, a femur head made of metal and having substantially the shape of a spherical segment, said head having a solid front portion and a rear portion formed with a depression extending inwardly from the flat face of the spherical segment; a nail adapted to be driven into the medullary portion of the femur and including an extension projecting obliquely from one end of said nail, said extension and said nail being formed with an aperture passing in longitudinal direction of said extension through said extension and said nail; a metal pin integrally formed with said front portion of said head and projecting therefrom through said depression and beyond said flat face and being located in said aperture; and an intermediate part formed from plastic material, said intermediate part having a front portion abutting against said solid front portion of said head and slidably mounted in said depression of said head and having a rear portion adapted to be placed against the resected portion of the femur, said intermediate part being formed with an opening passing therethrough and said extension on said nail being located in said opening of said intermediate part, whereby said intermediate part may be easily assembled with said nail and said head so that an intermediate part may be exchanged against an intermediate part of different shape if such a need arises during the fitting of the prosthesis to the resected portion of the femur.

2. A prosthesis as described, adapted to be secured to the resected portion of the femur comprising, in combination, a femur head made of metal and having substantially the shape of a spherical segment, said head having a solid front portion and a rear portion formed with a depression extending inwardly from the flat face of the spherical segment; a nail adapted to be driven into the medullary portion of the femur and including an extension projecting obliquely from one end of said nail, said extension and said nail being formed with an aperture passing in longitudinal direction of said extension through said extension and said nail; a metal pin integrally formed with said front portion of said head and projecting therefrom through said depression and beyond said flat face, said pin passing with a slide fit through said aperture; and an intermediate part formed from thermosetting plastic material, said intermediate part having a front portion abutting against said solid front portion of said head and slidably mounted in said depression of said head and having a rear portion adapted to be placed against the resected portion of the femur, said intermediate part being formed with an opening passing therethrough and said extension on said nail being located in said opening of said intermediate part, whereby said intermediate part may be easily assembled with said nail and said head so that an intermediate part may be exchanged against an intermediate part of different shape if such a need arises during the fitting of the prosthesis to the resected portion of the femur.

3. A prosthesis as described, adapted to be secured to the resected portion of the femur comprising, in combination, a femur head made of metal and having substantially the shape of a spherical segment, said head having a solid front portion and a rear portion formed with a depression extending inwardly from the flat face of the spherical segment; a nail adapted to be driven into the medullary portion of the femur and including an extension projecting obliquely from one end of said nail, said extension and said nail being formed with an aperture passing in longitudinal direction of said extension through said extension and said nail; a metal pin integrally formed with said front portion of said head and projecting therefrom through said depression and beyond said flat face, said pin passing with a slide fit through said aperture, said pin and said aperture having non-circular cross-sections so that rotation of said pin in said aperture is prevented; and an intermediate part formed from thermosetting plastic material, said intermediate part having a front portion abutting against said solid front portion of said head and slidably mounted in said depression of said head and having a rear portion adapted to be placed against the resected portion of the femur, said intermediate part being formed with an opening passing therethrough and said extension on said nail being located in said opening of said intermediate part, whereby said intermediate part may be easily assembled with said nail and said head so that an intermediate part may be exchanged against an intermediate part of different shape if such a need arises during the fitting of the prosthesis to the resected portion of the femur.

4. A prosthesis as described, adapted to be secured to the resected portion of the femur comprising, in combination, a femur head made of metal and having substantially the shape of a spherical segment, said head having a solid front portion and a rear portion formed with a depression extending inwardly from the flat face of the spherical segment; a nail adapted to be driven into the medullary portion of the femur and including an extension projecting obliquely from one end of said nail, said extension and said nail being formed with an aperture passing in longitudinal direction of said extension through said extension and said nail, said nail having at said one end a substantially triangular cross-section and having a substantially rectangular cross-section at the other end thereof and being tapered from the triangular cross-section to the rectangular cross-section; a metal pin integrally formed with said front portion of said head and projecting therefrom through said depression and beyond said flat face and being located in said aperture; and an intermediate part formed from plastic material, said intermediate part having a front portion abutting against said solid front portion of said head and slidably mounted in said depression of said head and having a rear portion adapted to be placed against the resected portion of the femur, said intermediate part being formed with an opening passing therethrough and said extension on said nail being located in said opening of said intermediate part, whereby said intermediate part may be easily assembled with said nail and said head so that an intermediate part may be exchanged against an intermediate part of different shape if such a need arises during the fitting of the prosthesis to the resected portion of the femur.

References Cited in the file of this patent

UNITED STATES PATENTS

| | | |
|---|---|---|
| 2,719,522 | Hudak | Oct. 4, 1955 |

FOREIGN PATENTS

| | | |
|---|---|---|
| 719,308 | Great Britain | July 23, 1952 |
| 757,951 | Germany | Nov. 9, 1953 |
| 1,046,516 | France | July 8, 1953 |